United States Patent

[11] 3,594,510

[72] Inventor William H. Blashfield
Galion, Ohio

[21] Appl. No. 798,296
[22] Filed Feb. 11, 1969
[45] Patented July 20, 1971
[73] Assignee North Electric Company
Galion, Ohio

[54] DIAL PULSE RECEIVER CIRCUIT
7 Claims, 2 Drawing Figs.

[52] U.S. Cl. 179/16 AA, 179/84 R
[51] Int. Cl. H04g 3/04
[50] Field of Search 179/16.09 A, 18.3 A, 18 EB, 16.5, 16.4, 16.4 A, 78, 84, 18 FA, 16 AA, 16 E, 16 F

[56] References Cited

UNITED STATES PATENTS

| | | | |
|---|---|---|---|
| 3,426,159 | 2/1969 | Mann | 179/16 (.4) |
| 3,428,756 | 2/1969 | Epstein | 179/84 |
| 3,450,843 | 6/1969 | Fritschi | 179/16 (.4) |
| 3,478,175 | 11/1969 | Herter | 179/18 (.3A) |

*Primary Examiner*—Kathleen H. Claffy
*Assistant Examiner*—Randall P. Myers
*Attorney*—Dienner, Johnson, Emrich, Verbeck & Wagner

ABSTRACT: A solid-state dial pulse receiving circuit for use with an incoming pulsing loop in a telephone system comprising a solid-state circuit which provides sensitive response to direct current pulses, talking balance, common mode rejection of alternating current signals spuriously induced from adjacent powerlines and protection against false operation from transients. The circuit comprises an input transistor, associated circuitry and an output circuit which may operate a dial pulse receiving relay.

INVENTOR
WILLIAM H. BLASHFIELD

BY Brown Jackson Boettcher & Dienner

ATTORNEY

DIAL PULSE RECEIVER CIRCUIT

BACKGROUND OF THE INVENTION

Description of the Prior Art

In certain prior art arrangements, dial pulse receiving circuits which terminated in the dial pulse receiving electromagnetic relay of a register were lacking in sensitivity to dial pulses received over long transmission lines, although the common mode rejection inherently provided by the relay-nullified alternating currents which were spuriously induced into the telephone lines from adjacent power lines.

To improve the sensitivity of such circuits, solid-state dial pulses receiving circuits were incorportated at the input side of the registers. The solid-state circuits, however, did not reject the alternating current signals which were spuriously induced into the input lines to the register, and improper operation of the register would occur.

It is therefore an object of the present invention to provide solid-state means which improve the sensitivity of a dial pulse receiving circuit or loop-responsive circuit and maintain talking balance, while yet nullifying the effects of alternating current induced in a telephone line from neighboring power lines and guarding against transients.

SUMMARY OF THE INVENTION

The present invention comprises an improved dial pulse receiving circuit in a register used in an automatic telephone system, for example, which provides increased sensitivity to incoming direct current signals, such as dial pulses, maintains talking balance, discriminates between such direct current signals and false signals which may result from alternating current induced into the telephone lines by adjacent powerlines, and also guards against transients incoming over the telephone lines. The novel circuit specifically includes an arrangement which terminates the incoming telephone line over which the direct current signals are received in the base-collector circuit of a transistor which has uniquely arranged biasing means for effecting common mode rejection of the spurious signals and talking balance, while yet reproducing direct current pulses over an associated output circuit. The circuitry associated with the transistor includes a capacitor for introducing a delay and a Zener diode for rendering the delay essentially constant to guard against false operation due to transients. In a typical application, the dial pulse receiving circuit is connected to an incoming line in the system in parallel with a battery feed coil which provides high alternating current reactance to speech currents.

DESCRIPTION OF THE PREFERRED EMBODIMENTS

Figure 1:
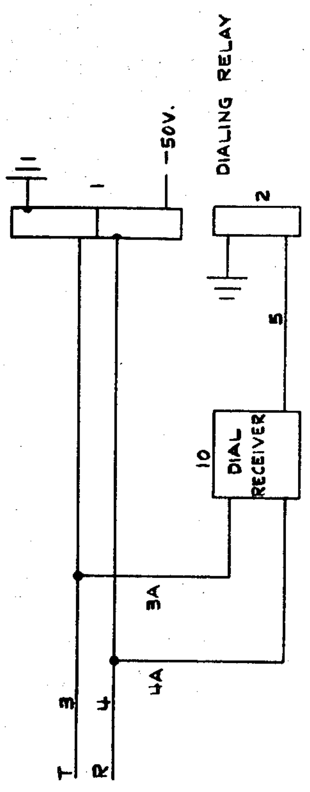
FIG. 1 discloses a circuit arrangement including the novel dial pulse receiver of the invention.

With reference to FIG. 1, the novel pulse receiver circuit 10 is shown connected to a pulsing loop which may, for example, comprise a subscriber line in an automatic telephone system. As there shown, the lines comprise a trip conductor 3 and a ring conductor 4 which are supplied with ground and −50 v. battery over a feed coil 1. Each half of the winding of feed coil 1 has a resistance of 250 ohms and a polarity as shown in FIG. 1.

The input of the pulse receiver 10 is connected via conductors 3A and 4A to the tip and ring conductors 3 and 4 respectively (and thereby across the feed coil 1) and the output of the pulse receiver 10 comprises a single conductor connected over a dialling relay 2 to the ground. As will be shown, with the subscriber line in the normal condition (i.e., with the subscriber on-hook), the output of the pulse receiver 5 will be such that the dialling relay 2 will be restored. Whenever the subscriber goes off-hook, the pulse receiver 10 will detect the changed condition of the subscriber line and will cause the dialling relay 2 to operate.

Figure 2:
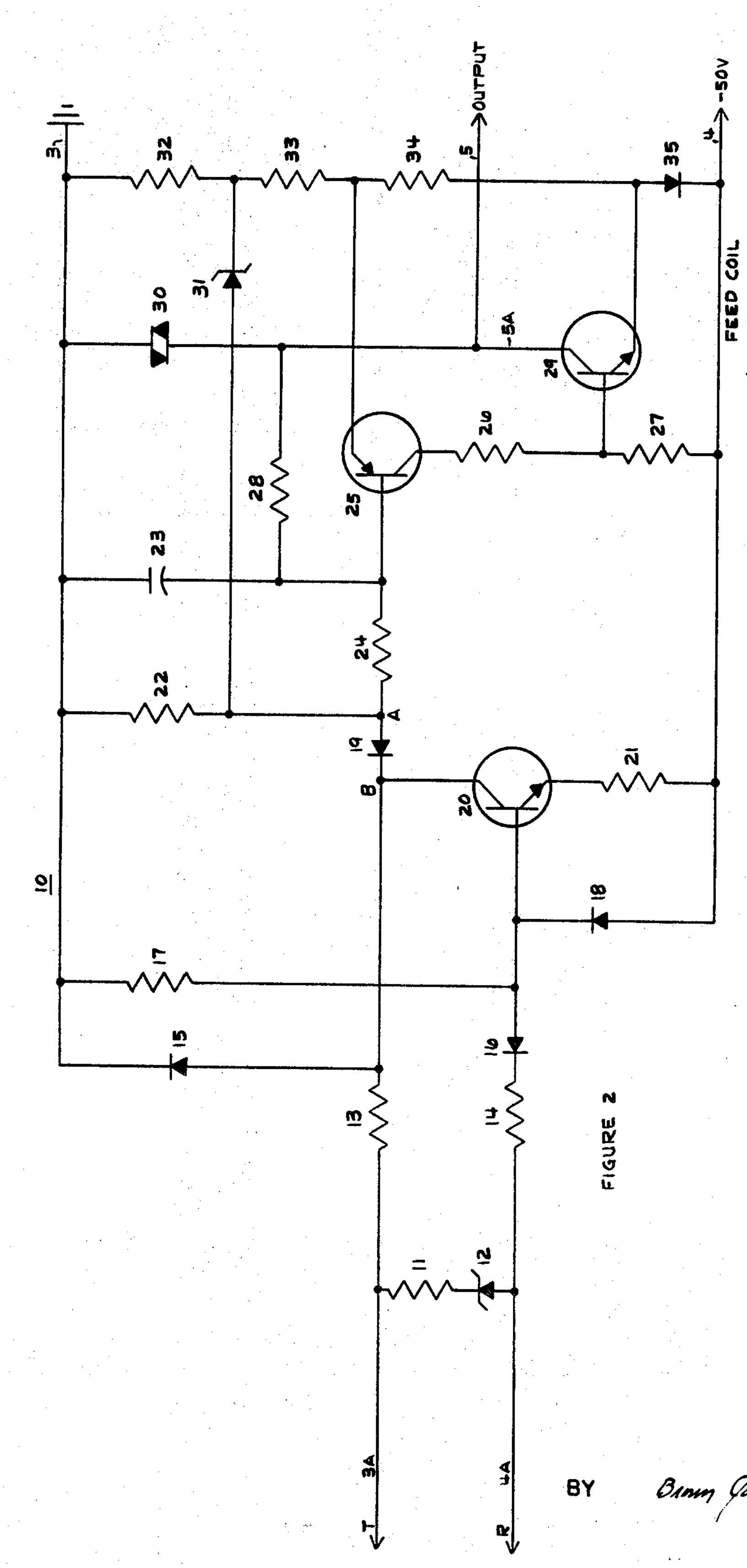
FIG. 2 sets forth the circuit diagram of the dial pulse receiver shown as a box in FIG. 1.

As noted above, in known automatic telephone installations there is a need for a circuit which has the sensitivity to operate in response to pulses received over long lines while yet having the ability to reject alternating current signals which are spuriously induced in the telephone lines. With reference to FIG. 2, a novel pulse receiver 10 which is operative in such manner is shown in more detail thereat. Input conductors 3A, 4A which, as noted above, may be connected to the tip and ring conductors of a subscriber line, are connected to an input circuit for the pulse-receiving circuit which includes a resistance 13 connected between input conductor 3A and the collector of an input transistor 20, and a series circuit comprising resistor 14 and diode 16 serially connected between input conductor 4A and the base of transistor 20. The emitter of transistor 20 is connected over resistor 21 to −50 v. potential. A circuit consisting of a Zener diode 12 and resistor 11 is connected across input conductors 3A and 4A to limit the magnitude of transient voltages. A diode 15 is connected between the collector of transistor 20 and ground, and a diode 18 is connected between the base of transistor 20 and −50 v. source to provide additional protection against possible damage by unusual transients which may appear on the tip and ring conductors 3A, 4A.

The collector of transistor 20 is further connected over a diode 19 to point A which is connected over resistor 22 to ground, over resistor 24 to the base of a second transistor 25, and over Zener diode 31 to the junction of resistors 32, 33 which are connected in the series circuit including resistors 32, 33, 34 and diode 35 connected between ground and −50 v. potential. Under normal conditions (that is, with the subscriber handset restored and the pulsing loop over conductors 3A, 4A open) transistor 20 is forward biased by a slight amount, and in its conduction, places point A in its collector circuit at approximately −8v.

The base of transistor 25 is also connected over capacitor 23 to ground and over resistor 28 and varistor 30 to ground. The collector of transistor 25 is connected over resistors 26 and 27 to the −50 v. source, and the emitter of transistor 25 is connected to the junction of resistors 33, 34. With such connection the emitter is at approximately −12 v. and transistor 25 is normally reverse biased. Capacitor 23 provides a delay in the output 5 to guard against false operation from transients at the input 34–4A and Zener diode 31 limits the voltage swing at point A to render the delay essentially constant taking into account lines of variable length.

Second transistor 25 responds to the output of the first transistor 20, the transistor 25 being normally off, and increasing in conductivity whenever the first transistor has increased conductivity in response to an off-hook condition.

A third transistor 29 which follows the operation of the first and second transistors has its collector connected to an output circuit 5 and over varistor 30 to ground; its base connected to the junction of resistors 26, 27 (and thereby to the output of transistor 25); and its emitter connected to the junction of resistor 34 and diode 35. Transistor 29 under normal conditions is reverse biased by the resistor 27 and diode 35. Varistor 30 which is connected to the collector prevents the voltage on conductor 5 from rising to dangerous high values during the inductive kick of the dial relay 2.

It should be observed that for common mode rejection of alternating signals induced from power lines adjacent to the telephone line, the following relationship should exist:

Resistance 21 (Resistance 14 +resistance 17) =(Resistance 17) (Resistance 13);

that for talking balance the following relationship should exist:

Resistance 14 +Resistance 17 =Resistance 13;

therefore that:

Resistance 17 =Resistance 21;

and that the ratio (Resistance 14)/(Resistance 17) should be chosen for desired direct current levels of transistor 20.

OPERATION

In the "off-hook" condition (i.e., when the subscriber removes his handset from the subscriber subset) the tip and ring conductors are connected through the line loop resistance whereby the voltage at the tip conductor 3A goes negative and the voltage at the ring conductor 4A becomes less negative. As the voltage on the ring conductor goes less negative, transistor 20 is biased to draw more current. However, since resistor 13 is much higher in value than resistor 14, the collector junction of transistor 20 is still reversed biased. Consequently NPN transistor 20 draws more current causing the voltage at point A to go sufficiently negative to forward bias the emitter-base junction of PNP transistor 25. Accordingly, transistor 25 starts conducting and through resistor 26 makes the base of NPN transistor 29 less negative. The less negative voltage forward biases the emitter-base junction of transistor 29 which conducts and through output circuit 5 applies a negative potential to the winding of dialling relay 2 (FIG. 1) to operate such relay. When the loop is opened the reverse procedure occurs, and the dialling relay 2 is released. Direct current pulses on the pulsing loop 3A, 4A are thus effective to pulse dialling relay 2.

In case of an alternating current induction from the neighboring powerlines, the voltages at both tip and ring conductors will follow the induced voltage (whether an on-hook or off-hook condition prevails). Both tip and ring conductors will go more positive during the positive half-cycle and more negative during the negative half-cycle of the spurious pulses.

During the positive half-cycle, the ring conductor 4A going more positive (or less negative) will through resistor 14 and diode 16 further forward bias the emitter junction of NPN transistor 20 which will accordingly conduct more and tend to make points B and A go more negative. However, at the same time, tip conductor 3A is going more positive and will tend to make points B and A go more positive. The two opposing effects effectively cancel each other at point B; and hence point B and accordingly point A remain at the same potential as though the induced alternating current was not present.

During the negative half-cycle the ring conductor 4A going more negative tends to make the emitter junction of the NPN transistor 20 less forward biased. Consequently, transistor 20 tends to conduct less and tends to make point B go more positive. However, at the same time, the tip conductor 3A is going more negative and through resistor 13 tends to make point B go more negative. The two opposing effects at point B effectively cancel each other, and the voltage level at point B (and accordingly at point A) remains the same as though the induced alternating current was not present. Consequently, the bias levels of NPN transistor 25 and transistor 29 are not affected, and no false operation of the dialling relay 2 (FIG. 2) takes place when a spurious alternating current signal induction condition occurs.

As noted heretofore the circuit relationship, and the relative values of resistors 13, 14, 17 and 21 are important to the accomplishment of a complete rejection of an alternating current induction and talking balance.

A typical list of component values for a circuit of the type disclosed in FIG. 1 is as follows:

| | |
|---|---|
| Resistor 11 | 2.2K |
| Zener 38 11 | Type IN4180B, 56v. |
| Resistor 13 | 31.6K |
| Resistor 14 | 6.81K |
| Resistor 17, 21 | 26.1K |
| Transistor 20 | Type 2N2270 |
| Resistor 22 | 68.1K |
| Resistor 24 | 8.2K |
| Capacitor 23 | 68μf. |
| Transistor 25 | Type 2N4036 |
| Resistor 26 | 10K |
| Resistor 27 | 3.3K |
| Resistor 28 | 1 Meg |
| Transistor 29 | Type 2N3440 |
| Zener Diode 31 | Type IN4158B, 6.8v. |
| Resistor 32 | 560 ohms |
| Resistor 33 | 270 ohms |
| Resistor 34 | 2.7K |

While the foregoing values are given for exemplary purposes, the invention should not be considered limited to the use of the disclosed specific set of values.

I claim:

1. In an automatic telephone system having a pulsing loop connected to a direct current feed circuit, a pulse circuit including a pair of input terminals connected across said pulsing loop, a first transistor having emitter, base and collector elements, means biasing said transistor to conduct at a first level in response to application of a first set of potentials to said input terminals and at a second level in response to application of a second set of potentials to said input terminals including means connecting said base element through a first resistor $R_1$ to a first one of said input terminals and over a second resistor $R_2$ to a voltage of a first fixed value means connecting said collector element over a third resistor $R_3$ to a second one of said input terminals, and means connecting said emitter over a fourth resistor $R_4$ to a voltage source of a second fixed value, said resistors being of a value approximately in the relation $$R_4(R_1+R_2)=(R_2)(R_3)$$

said transistor having increased conductivity relative to its existing level of conduction at the time of occurrence of the positive cycle of a common mode signal at said first terminal tending to make the potential at said collector more negative relative to ground and of a value to balance out the more positive potential at said second terminal, said transistor having decreased conductivity relative to its existing level of conduction during the negative cycle of a common mode signal at said first terminal causing the collector potential to tend to go more positive relative to ground to a value which balances out the more negative potential which appears at the collector of said transistor, whereby said transistor rejects the common mode signals which occur on said input terminals, and an output circuit connected to said transistor to provide a holding circuit for associated equipment only when said second set of potentials is applied to said loop.

2. In an automatic telephone system as set forth in claim 1 in which the third resistance $R_3$ is equal to the sum of the first and second resistances $R_1$ and $R_2$ to equalize the talking balance.

3. In an automatic telephone system as set forth in claim 1 in which said pulsing loop is closed during the application of said second set of potentials thereto and is opened and closed to transmit direct current pulses to said pulse-receiving circuit, and in which said output circuit is operative to complete said holding circuit to said associated equipment when said pulsing loop is closed and is operative to extend said pulses to the associated equipment over said holding circuit in response to opening and closing of said pulsing loop.

4. In an automatic telephone system as set forth in claim 1 in which a given voltage appears across said input terminals when said pulsing loop is open and a lesser voltage appears across said terminals when said pulsing loop is closed.

5. In an automatic telephone system as set forth in claim 1 in which said direct current feed circuit comprises battery feed coils of substantially equal impedance connected to said pulsing loop in parallel with said pulse receiving circuit.

6. In an automatic telephone system as set forth in claim 1 in which said output circuit includes a second transistor having a base element connected to the collector of the first transistor and in which the potential at the collector of said first transistor is of a value to control said base element to maintain said second transistor off whenever said pulsing loop is open, a third transistor having a base element connected to the output of said second transistor, whereby said third transistor is turned off with said second transistor, and a dialling relay connected to the collector element of said third transistor operative in response to turn on of said second and third transistors whenever said pulsing loop is closed.

7. In an automatic telephone system having a pulsing loop connected to a direct current feed circuit, a pulse receiving circuit including a pair of input terminals connected across said pulsing loop, a first transistor having emitter, base and collector elements, means biasing said transistor to conduct at a first level in response to application of a first set of direct current potentials to said input terminals and to conduct at a second level in response to the application of a second set of direct current potentials to said input terminals including means connecting said base element through a first resistor $R_1$ to a first one of said input terminals and over a second resistor $R_2$ to a voltage source of a first fixed value, means connecting said collector element over a third resistor $R_3$ to a second one of said input terminals, and means connecting said emitter over a fourth resistor $R_4$ to a voltage source of a second fixed value, said resistors being of a value approximately in the relation $$R_4(R_1+R_2)=(R_2)(R_3);$$

said transistor being operable in response to a common mode signal of a given polarity and amplitude at said first and second terminals to provide a potential at said collector which has opposite polarity and substantially equal amplitude to the common mode signal to thereby balance out the common mode signal which appears at said second terminal, and output means connected to the output of said transistor to provide a holding signal for associated equipment whenever said second set of potentials is applied to said input terminals.